HAWLEY & STAFFORD.
Harvester Dropper.
No. 44,996. Patented Nov 8, 1864.
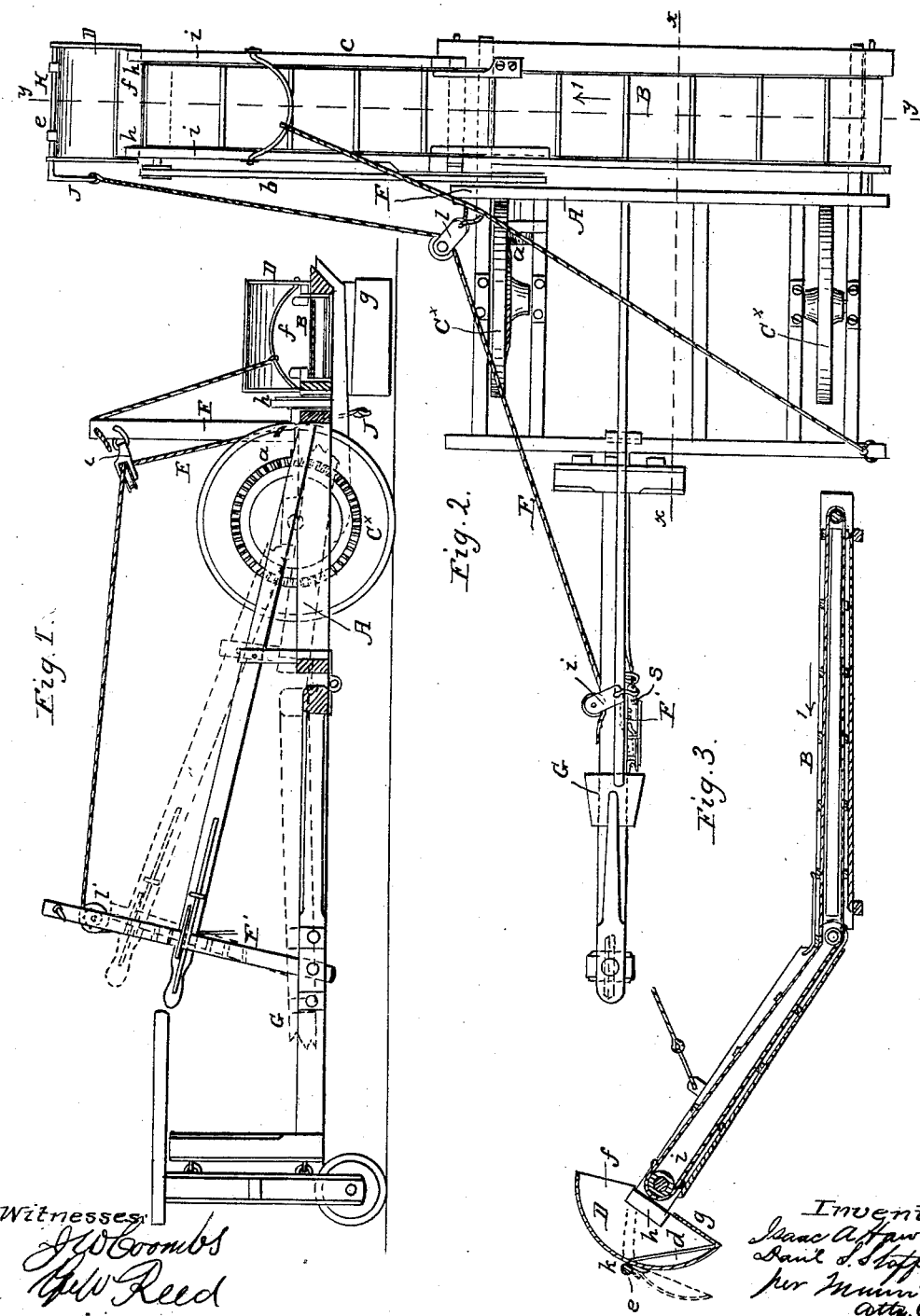

UNITED STATES PATENT OFFICE.

ISAAC HAWLEY, OF PEKIN, AND DANL. S. STAFFORD, OF DECATUR, ASSIGNORS TO THEMSELVES, S. E. BARBER, AND S. F. HAWLEY, OF PEKIN, ILLINOIS.

IMPROVEMENT IN HARVESTING-MACHINES.

Specification forming part of Letters Patent No. 44,996, dated November 8, 1864.

*To all whom it may concern:*

Be it known that we, ISAAC HAWLEY, of Pekin, in the county of Tazewell and State of Illinois, and DANIEL S. STAFFORD, of Decatur, in the county of Macon and State aforesaid, have invented a new and Improved Gavel-Discharging Attachment for Harvesters; and we do hereby declare that the following is a full, clear, and exact description of the same, reference being had to the accompanying drawings, forming a part of this specification, in which—

Figure 1 is a side sectional view of a harvester with our invention applied to it, $x\,x$, Fig. 2, indicating the line of section; Fig. 2, a plan or top view of the same; Fig. 3, a vertical section of the same, taken in the line $y\,y$, Fig. 2.

Similar letters of reference indicate corresponding parts in the several figures.

This invention relates to a new and improved gavel-discharging device to be applied to those harvesters which are provided with endless aprons for discharging the cut grain.

The object of the invention is to obtain a simple and economical device which will receive the cut grain from the endless apron and admit of having the grain discharged from it at suitable intervals and in proper-sized gavels for binding, as hereinafter fully set forth.

To enable those skilled in the art to fully understand and construct our invention, we will proceed to describe it.

A represents the main frame of a harvester, and B an endless apron placed at the front part of the main frame and directly behind the sickle, in order to receive the cut grain. This endless apron is moved in the direction indicated by the arrow 1, (see Fig. 2,) and is operated through the medium of gearing $a$ and a belt, $b$, from one of the wheels C*, which support the main frame A.

The endless apron B, as well as the other parts of the harvester, may be arranged in any proper way, as our invention is applicable to all harvesters in which an endless apron is employed for discharging the cut grain. There are quite a number of harvesters of this class, some of which are patented.

In most of the harvesters of this class the endless apron B works in a frame, C, which is provided with a joint to admit of the outer discharge end of the apron being raised or lowered, as may be desired. The drawings illustrate a harvester of this class, the outer part of the apron-frame C being designated by $c$.

Our invention consists of a box, D, which may be constructed of metal or wood. Sheet metal will probably be the material used. This box is fitted on the outer end of the part $c$ of the apron-frame C, and it may be of semi-cylindrical form, the lower outer part, $d$, of the curved surface, which is the outer side of the box, being suspended on a hinge, $e$, at its upper end, as shown clearly in Fig. 3. The inner side of the upper part of the box D is open, as shown at $f$, the lower part, $g$, being closed, and the open part $f$ being in line with the endless apron B, so as to receive the cut grain therefrom. The box D may be secured on the part $c$ of the apron-frame C by having sockets $h\,h$ secured at each side of it to receive the ends of the two bars $i\,i$ of the said part $c$. Other modes of attachment may be devised for the purpose. The door $d$ of the box D will have a tendency to swing open by virtue of its own gravity, and it is kept closed by a cord or chain, E, which is attached to an arm, $j$, at one end of the pintle $k$ of the hinge $e$, and extends through a sheave, $l$, attached to an upright, F, on the frame A and back through a sheave, $l'$, attached to an upright lever, F', to the driver's stand G, the back end of the cord or chain being provided with a loop, in which the driver may insert his foot.

The operation is as follows: As the harvester is drawn or propelled along the cut grain falls upon the endless apron B, which conveys it into the box D, the door $d$ of which is kept in a closed state by the driver through the medium of a cord or chain, E, and when a sufficient quantity of grain has been discharged into box D to form a gavel of sufficient size for binding, the driver slackens the cord or chain E, and the door $d$ swings open and the gavel escapes. The door $d$ is then closed by tightening or drawing open the cord or chain E, which is again slackened when a sufficient quantity of grain has been discharged into the box D to form a gavel.

Having thus described our invention, what we claim as new, and desire to secure by Letters Patent, is—

The box D, provided with a door, $d$, and applied to the apron-frame C, in connection with a cord or chain, E, all arranged to operate in the manner substantially as and for the purpose herein set forth.

ISAAC HAWLEY.
    DANIEL S. STAFFORD.

Witnesses:
 JNO. GRIDLEY,
 THOS. KING, Sr.